No. 678,152. Patented July 9, 1901.
C. B. ANDREWS.
MACHINE FOR MAKING BOX TRAYS.
(Application filed Aug. 11, 1900.)

(No Model.) 5 Sheets—Sheet 1.

Witnesses:
Jas. E. Hutchinson
Henry C. Hazard

Inventor.
Charles B. Andrews, by
Prindle and Russell,
Attorneys

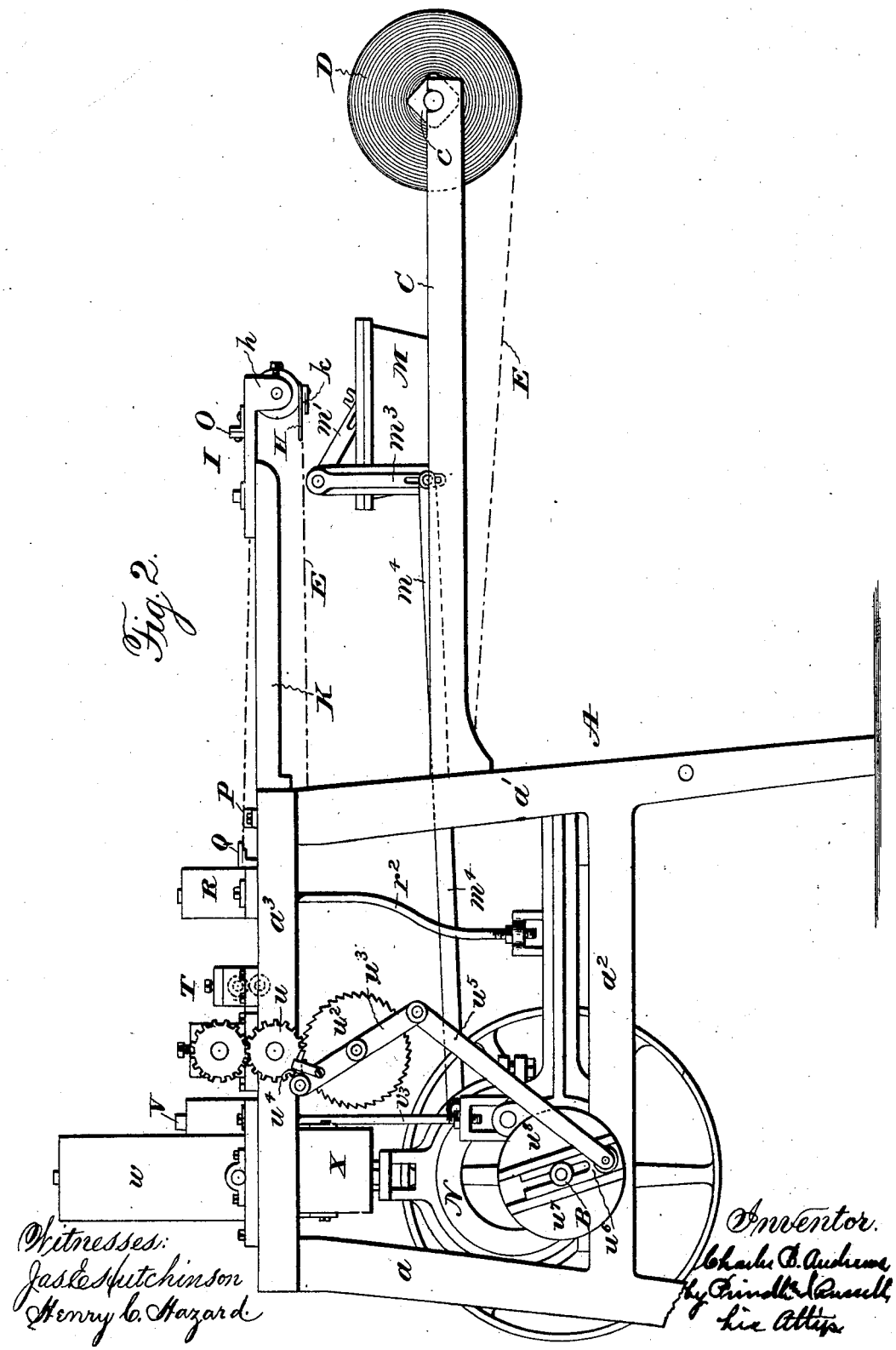

No. 678,152. Patented July 9, 1901.
C. B. ANDREWS.
MACHINE FOR MAKING BOX TRAYS.
(Application filed Aug. 11, 1900.)
(No Model.) 5 Sheets—Sheet 3.
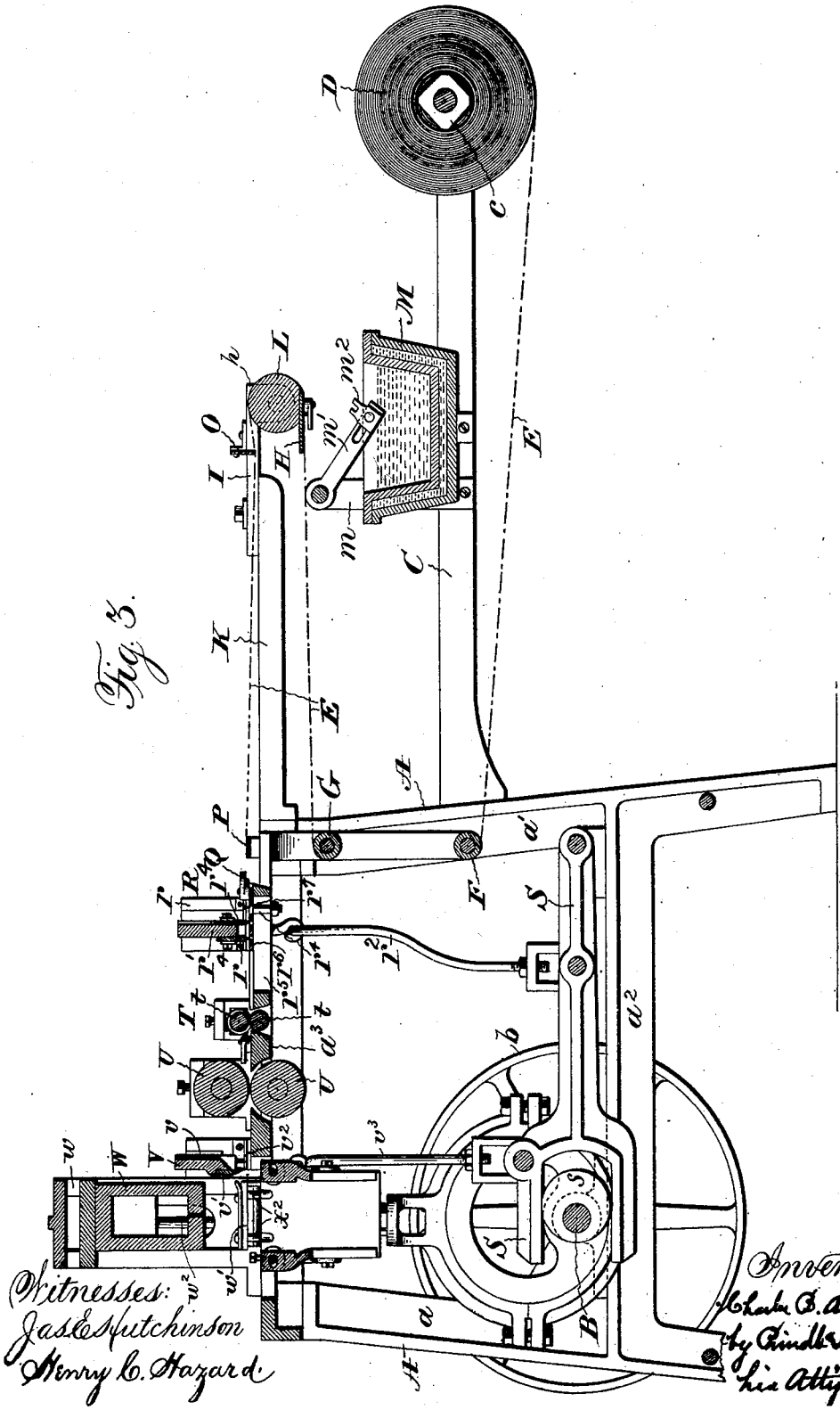

No. 678,152. Patented July 9, 1901.
C. B. ANDREWS.
MACHINE FOR MAKING BOX TRAYS.
(Application filed Aug. 11, 1900.)
(No Model.) 5 Sheets—Sheet 4.
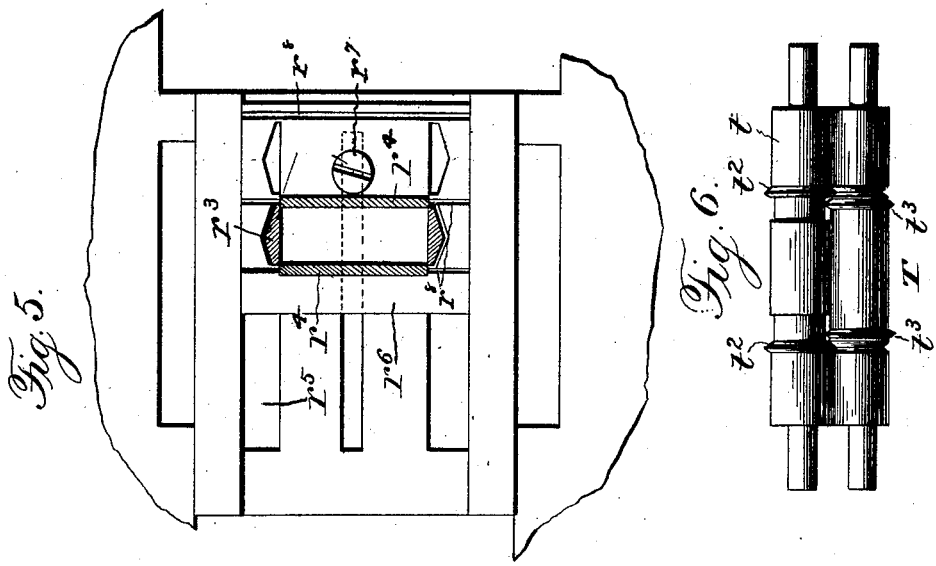
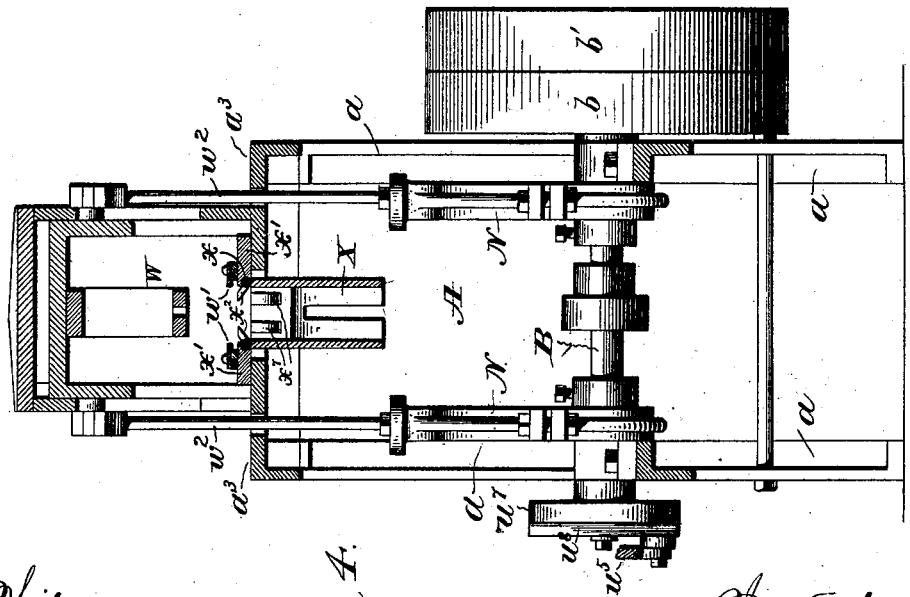
Witnesses:
Jas. E. Hutchinson.
Henry C. Hazard.
Inventor.
Charles B. Andrews, by
Prindle & Russell, his Attys.

No. 678,152. Patented July 9, 1901.
C. B. ANDREWS.
MACHINE FOR MAKING BOX TRAYS.
(Application filed Aug. 11, 1900.)
(No Model.) 5 Sheets—Sheet 5.

Witnesses:
Jas. E. Hutchinson
Henry C. Hazard

Inventor.
Charles B. Andrews, by
Prindle and Russell, his Attys

UNITED STATES PATENT OFFICE.

CHARLES B. ANDREWS, OF LEBANON, PENNSYLVANIA, ASSIGNOR TO THE DIAMOND MATCH COMPANY, OF CHICAGO, ILLINOIS.

MACHINE FOR MAKING BOX-TRAYS.

SPECIFICATION forming part of Letters Patent No. 678,152, dated July 9, 1901.

Application filed August 11, 1900. Serial No. 26,615. (No model.)

*To all whom it may concern:*

Be it known that I, CHARLES B. ANDREWS, a citizen of the United States, residing at Lebanon, in the county of Lebanon, and in the State of Pennsylvania, have invented certain new and useful Improvements in Machines for Making Box-Trays; and I do hereby declare that the following is a full, clear, and exact description thereof, reference being had to the accompanying drawings, in which—

Figure 1:
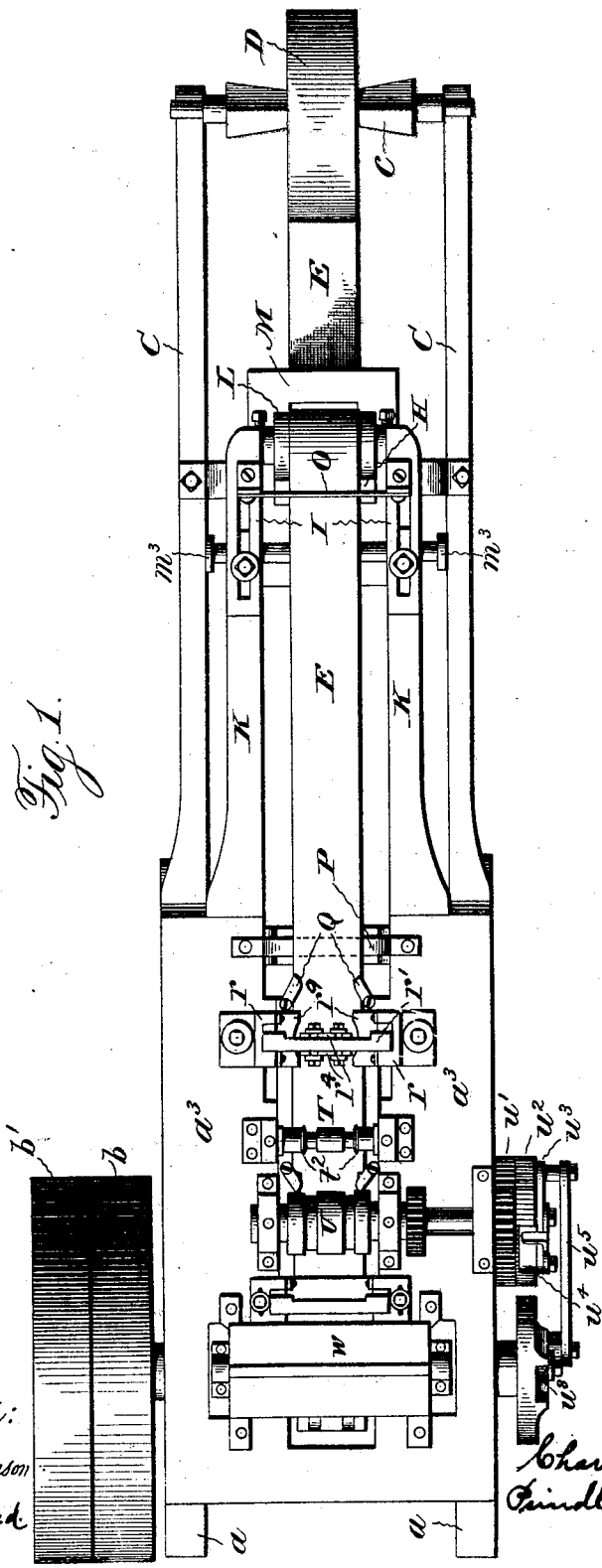
Figure 9:
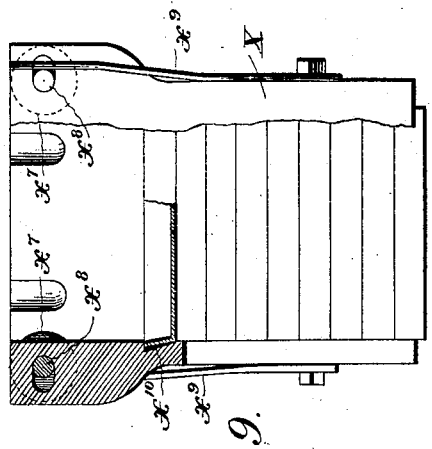
Figure 10:
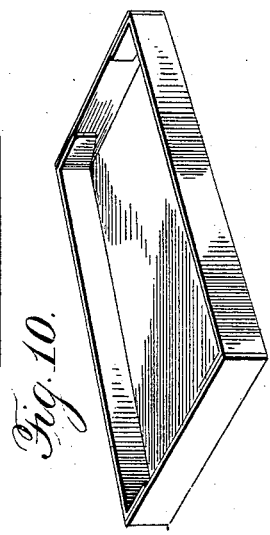
Figure 7:
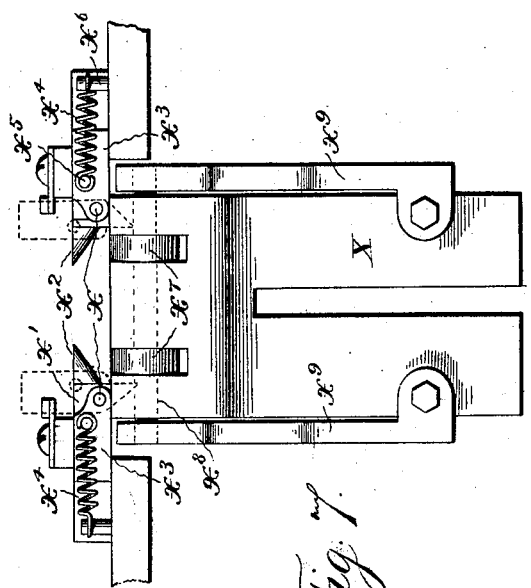
Figure 8:
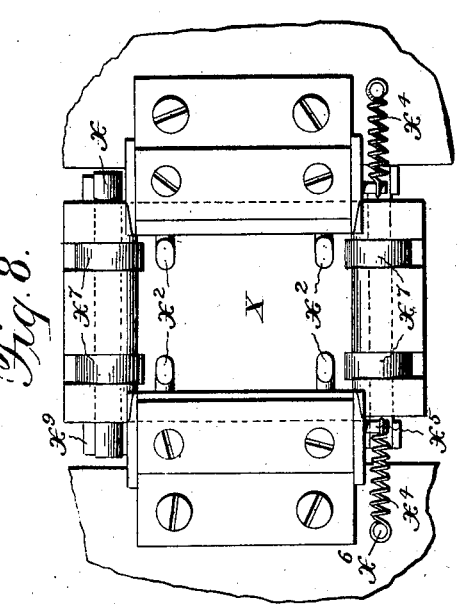

Figure 1 is a plan view of a machine embodying my invention. Fig. 2 is a side elevation thereof. Fig. 3 is a vertical longitudinal sectional view of the same. Fig. 4 is a vertical transverse sectional view thereof. Fig. 5 is a plan view of the punching-die, the punches and scoring-plates being shown in section. Fig. 6 is a front elevation of the creasing-rolls. Fig. 7 is an end elevation of the box-tray folding and receiving receptacle. Fig. 8 is a plan view of the mechanism shown in Fig. 7. Fig. 9 is a vertical transverse sectional view of the same mechanism. Fig. 10 is a perspective view of a tray such as is made by my machine; and Fig. 11 is a plan view of a strip notched and scored to form my trays.

Letters of like name and kind refer to like parts in each of the figures.

Figure 11:
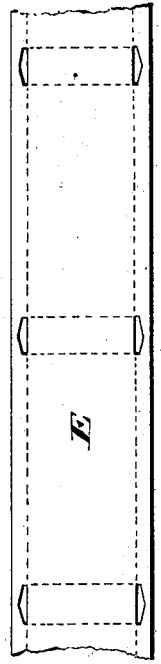

The product of this machine, as illustrated in Figs. 10 and 11, is a box-tray formed from a blank consisting of a rectangular bottom having along each side a rectangular piece, which pieces when folded perpendicularly form the sides and ends of the tray, the sides having corner-flaps which are cut away at their lower edges and that are glued to the ends. The blanks for such trays are cut out of a strip of strawboard, heavy paper, or similar material, that is fed through the machine to be described.

The object of my invention has been to produce a machine for making box-trays which shall have improved means for performing any or all the functions of gluing, notching, scoring, folding, and severing a blank for a box-tray from a strip of material and of folding such blank into tray form and holding its parts in position until the glue has set and which machine shall have improved operating mechanism; and to such ends my invention consists in the machine for making box-trays hereinafter specified.

In carrying my invention into practice I provide a frame A, consisting of front and rear legs $a$ and $a$ and $a'$ and $a'$, respectively, which are connected below by cross-bars $a^2$ and $a^2$ and which support above a rectangular table $a^3$. A driving-shaft B is supported in bearings on the cross-bars $a^2$ and $a^2$ and has fast and loose pulleys $b$ and $b'$ on one end thereof. Two parallel arms C and C extend rearward from the legs $a'$ and $a'$ and support at their rear ends a spool $c$, on which is supported a roll D of heavy paper, strawboard, or other material, from which the box-trays are to be made. From the roll D the strip E passes forward and upward over two rolls F and G, which are supported on pins secured in two arms which depend from the table $a^3$. A plate H is secured to brackets $h$ and $h$ on a plate I, that is secured to arms K and K, which are supported by the legs $a'$ and $a'$, and a roll L is journaled in said brackets $h$ and $h$. On the arms C and C is supported a glue-pan M, which is shown as steam-jacketed. A pair of standards $m$ and $m$ rise above the glue-pan and an arm $m'$ is secured to a rock-shaft that has bearings therein, such arm having a slot through which passes a bolt that adjustably secures to it a glue-applying block $m^2$. From the rolls F and G the strip E passes beneath and across the plate H and around the roll L, leaving the latter in a forward direction. The block $m^2$ has on its upper face projections which correspond to the locations to which it is desired to apply the glue on the strip, and such arm is positioned so that it can be swung up and strike the strip as it extends across the plate H. The rock-shaft of the arm $m'$ has an arm $m^3$ secured thereto, which arm is connected by a bolt passing through a slot therein with a link $m^4$, which latter is bolted to the strap of one of a pair of eccentrics N and N on the driving-shaft B. The motion of the eccentric thus causes the arm $m'$ to swing its block $m^2$ alternately into the glue and against the strip E as it extends across the plate H. A pair of guides $k$ and $k$, each consisting of a vertical cylindrical body having a horizontal arm projecting therefrom and each of which is secured to one of the brackets $h$ or $h$ by a bolt which passes eccentrically through such body, serves to guide the strip centrally across the plate H. By adjusting the guides angularly around the bolts which secure them strips of different widths can be guided. In order to spread the glue evenly over the portions of the strip to be glued, a plate O is secured to the brackets $h$ and $h$ in such position that it is substantially vertical to the strip, and such plate is wiped over by the glue in passing. The adjustability of the brackets $h$ and $h$ enables the proper presentation of the glued portions of the strip to the subsequent mechanism. After leaving the plate O the strip passes forward over a bridge-piece P, between guides Q and Q, and under the scoring and punching mechanism R. Such mechanism comprises a pair of vertical guides $r$ and $r$, which are secured to the table by bolts passing through slots in the guides, so that their position can be changed longitudinally of the table. Within the guides a punching-head $r'$ is reciprocated by a rod $r^2$, which is secured to a lever S, the latter being fulcrumed near the rear end of the cross-bar of the frame and having its front end forked to embrace an eccentric $s$, which is secured on the driving-shaft. The punching-head carries punches $r^3$ and $r^3$, which are shaped to remove the material from under two abutting corner-flaps, where the blanks for two trays come together on the strip, and such punching-head also has adjustably bolted to its sides two scoring-blades $r^4$ and $r^4$, by which the transverse scores of the adjacent ends of two blanks are formed. Beneath the punches $r^3$ and $r^3$ slots $r^5$ and $r^5$ are formed in the table to permit the escape of punchings. The die-plate $r^6$ is secured to the table by a bolt passing through such plate and through a longitudinal slot in the table, such construction permitting adjustment of the plate longitudinally of the table. The die-plate is provided with openings corresponding to the punches $r^3$ and $r^3$ and with transverse grooves to coact with the scoring-blade. Such plate is also provided with openings for the reception of punches of a different size from the openings first mentioned and with transverse grooves to coact with scoring-blades to correspond with such second pair of punches, so that by the substitution of another punching-head with proper punches and scoring-blades and the turning half around or longitudinal adjustment of the die-plate a tray of a different size can be formed. Horizontal plates $r^9$ and $r^9$ are bolted to the guides $r$ and $r$ and project over the strip to prevent it from rising with the punches. As the strip approaches the punching and scoring mechanism it passes between guides that are similar to the guides $k$ and $k$. After being punched and scored the strip passes through the creasing mechanism T, which consists of a pair of rolls $t$ and $t'$, which are journaled in brackets on the table, the upper roll having bearing in boxes that are movable in guides in the brackets, such boxes being forced downward by screws in the brackets. The upper roll $t$ has formed upon it two annular ribs $t^2$ and $t^2$, which are triangular in cross-section, such ribs coöperating with similar grooves in the lower roll $t'$ and serving to form the creases or folds at the junction of the sides and bottom of the tray. Ribs $t^3$ and $t^3$, similar to the ribs $t^2$ and $t^2$, are formed on the lower roll, between the grooves therein and opposite necks on the upper roll. The ribs $t^3$ and $t^3$ form creases which are reversed in position to those formed by the ribs $t^2$ and $t^2$, the two creases enabling the sides of the tray when bent into position to stand vertical to the bottom and not have a tendency to spring outward. The rolls $t$ and $t'$ are without operating mechanism other than the strip which turns them as it is drawn through them.

From the creasing mechanism the strip passes between guides similar to the guides $k$ and $k$ and is engaged by the feed-rolls U and U. The latter are mounted in the same manner as the creasing-rolls and are grooved to prevent contact of the roll with the glued portions of the strip. The feed-rolls have intermeshing gears on their shafts, and the shaft of the lower roll also carries a pinion $u$, which meshes with a gear $u'$ on a stud on the side of a frame, such gear having concentrically secured to it a ratchet-wheel $u^2$. A lever $u^3$ is also pivoted on the stud of the gear $u'$, such lever carrying a spring-pressed pawl $u^4$ at its upper end and having its lower end pivoted to a crank-pin on an end of a link $u^5$, whose opposite end is pivoted to a block $u^6$, that is bolted to a disk $u^7$ on the end of the driving-shaft, the latter having guides $u^8$ and $u^8$ for the block and the block having a slot through which its securing-bolt passes. Such construction permits the adjustment of the block $u^6$ on the disk $u^7$, so that the throw of the crank-pin thereon may be adjusted to vary the movement of the feed-rolls.

A cutter-head V is reciprocable in vertical guides $v$ and $v$, which are bolted to the table, such guides being adjustable longitudinally of the table by reason of slots in their bases, through which the securing-bolts pass. The cutter-head has a knife $v'$ secured thereto, and horizontal plates $v^2$ and $v^2$ are secured to the guides and extend over the strip to prevent its rising with the knife. The cutter-head is reciprocated by a rod $v^3$, which is secured to the lever S, such rod having an eye which is secured in an eyebolt on the cutter-head.

At the time the blank is severed from the strip it lies on plates $x'$ and $x'$ and beneath a plunger W, whose lower end is of the size and shape of the tray-bottom, and which plunger is reciprocable in guides formed in a frame $w$, that is secured on the table. The blank is held in place on plates $x'$ and $x'$ by overhanging guides $w'$ and $w'$. The plunger is reciprocated by rods $w^2$ and $w^2$, having trunnions secured to such plunger, such rods being screwed into the straps of the eccentrics N and N on the driving-shaft. A rectangular tube X is secured to the table beneath the plunger W, and such tube is open at its upper and lower ends. Above the mouth of the tube and beneath the plates $x'$ and $x'$, whose edges project flush with the longitudinal edges of the mouth, two rock-shafts $x$ and $x$ are journaled in positions along such edges of the mouth. Such rock-shafts have fingers $x^2$ and $x^2$ normally projecting therefrom and into the path of the plunger W. On the ends of the rock-shafts are secured arms $x^3$ and $x^3$, whose opposite faces are in line with the inner front and rear walls of the tube. The upper edges of the arms $x^3$ and $x^3$ are preferably flush with the upper surfaces of the plates $x'$ and $x'$, or they may be placed below such surfaces, so that they offer no obstruction to the blank while the latter is being moved into place along the said plates and beneath the folding-plunger. Springs $x^4$ and $x^4$ connect pins $x^5$ and $x^5$ on the plates $x^3$ and $x^3$ with pins $x^6$ and $x^6$ on the table, the action of such springs being to tend to hold the rock-shafts so that the fingers $x^2$ and $x^2$ shall stand in the path of the plunger, while the arms $x^3$ and $x^3$ stand substantially horizontal. Rollers $x^7$ and $x^7$ are journaled in slots in the front and rear walls of the tube on shafts $x^8$ and $x^8$, which are journaled in horizontal slots in the tube-walls, such shafts being pressed inward by springs $x^9$ and $x^9$, which are screwed to the tube and have their free ends bearing against the ends of the shaft. A downward-projecting shoulder $x^{10}$ is formed in the tube in its upper portion.

The operation of my machine is as follows: The strip E is led from the roll D around the rolls F and G, over the plate H, and around the roll L, through the punching and creasing mechanisms R and T, respectively, and to the feed-rolls U and U, by which latter it is drawn intermittently forward. As the strip pauses the glue-applying block $m^2$ is raised from the glue-pan and imprints glue on the portions of the strip where the corner-flaps are to be secured to the ends of the tray, the pressure of such block being resisted by the plate H. As the strip passes under the plate O the glue is spread evenly over the desired portions of the strip, and the latter then travels to the punching and scoring mechanism R, where the punch removes the material to produce the inclined lower edge of the corner-folds at the adjacent ends of two blanks, and the scoring-plates form the transverse scores on the adjacent ends of two blanks. The strip is then drawn through the creasing-rolls and the longitudinal creases of the blanks are formed. After passing through the feeding-rolls the length of a blank is projected beyond the severing-knife $v'$ and beneath the plunger W, where it rests on the plates $x'$ and $x'$ and above the fingers $x^2$ and $x^2$. The knife $v'$ then severs the blank, and the plunger W descends upon it, forcing it between the plates $x'$ and $x'$, thus turning up the sides of the tray. The plunger then strikes the fingers $x^2$ and $x^2$ and depresses them, thus turning the rock-shafts and throwing the arms $x^3$ and $x^3$ against the corner-flaps and turning them against the sides of the plunger. The farther descent of the plunger carries the tray past the rollers $x^7$ and $x^7$, which latter turn the ends of the tray against the glued corner-flaps. The plunger then carries the tray into the tube, where it fits perfectly enough to insure its retention in shape until the glue has set. The plunger carries the tray into the tube until the upper edge of the tray engages the shoulder $x^{10}$, and the tray is thus prevented from following the plunger on its return movement. Each tray as it enters the tube forces the previously-formed ones down the tube until they issue singly from its lower end, the length of the tube being sufficient, so that the glue will have set during the passage of a tray therethrough.

Having thus described my invention, what I claim is—

1. In a machine for making box-trays, the combination of means for applying adhesive material in spots to a portion only of a blank, and means for spreading such adhesive material into independent stripes of uniform thickness over a portion only of the paper, substantially as and for the purpose described.

2. In a machine for making box-trays, the combination of means for applying adhesive material in spots to a portion only of a blank, and stationary means for spreading such adhesive material into independent stripes of uniform thickness over a portion only of the paper, substantially as and for the purpose described.

3. In a machine for making box-trays, the combination of means for applying adhesive material in spots to a portion only of a blank, and a scraper arranged to bear upon the strip for the purpose of spreading such adhesive material into independent stripes of uniform thickness over a portion only of the paper, substantially as and for the purpose described.

4. In a machine for making box-trays, a folding mechanism comprising a plunger, a flap-turning arm pivoted in the plane of a face of the plunger, the pivot thereof being near and parallel to the plane of another face of the plunger, and means for swinging such arm toward the plunger in a direction opposite to the operative movement of the plunger, substantially as and for the purpose described.

5. In a machine for making box-trays, a folding mechanism comprising a support for a tray-blank, a plunger about which the blank is adapted to be folded, a flap-turning arm pivoted to swing in the plane of a face of the plunger, the pivot of such arm being parallel to another face of the plunger, such arm being normally below the plane of said support for the blank, and means for swinging the flap-turning arm toward the plunger in a direction opposite to the operative movement of the plunger, substantially as and for the purpose described.

6. In a machine for making box-trays, a folding mechanism comprising a support for a tray-blank, such support having an opening therein, a plunger that is adapted to enter said opening, shafts journaled in said support on opposite sides of the opening, flap-turning arms on such shafts and perpendicular thereto, said arms being normally below the blank-supporting surface, and fingers on said shafts and projecting into the path of the plunger, whereby the flap-turning arms are turned upward and toward the plunger as the latter descends, substantially as and for the purpose described.

7. In a machine for making box-trays, a folding mechanism consisting of the combination of a reciprocating plunger, a tube into which the trays are forced by the plunger, a pair of rock-shafts at the upper end of said tube, fingers on said rock-shafts adapted to be operated by the plunger, flap-turning arms on the ends of said rock-shafts, such arms projecting into the path of the lower face of the plunger, and means for turning up the sides and ends of the tray, substantially as and for the purpose described.

8. In a machine for making box-trays, a folding mechanism, comprising a reciprocating plunger, a tube into which the trays are forced by the plunger, a pair of plates having edges that are in substantially the same plane as two opposite, inner walls of the tube, but above said tube, a pair of rock-shafts beneath said plates, such rock-shafts having fingers that normally project into the path of the lower face of the plunger, and having folding-arms whose adjacent faces are substantially in line with the two of the inner walls of said tube, and means for turning up the ends of the trays, substantially as and for the purpose described.

In testimony that I claim the foregoing I have hereunto set my hand this 14th day of June, 1900.

CHARLES B. ANDREWS.

Witnesses:
DANIEL P. WITMEYER,
JOHN H. BOWMAN.